(12) United States Patent
Avadhany et al.

(10) Patent No.: US 8,376,100 B2
(45) Date of Patent: Feb. 19, 2013

(54) REGENERATIVE SHOCK ABSORBER

(75) Inventors: Shakeel Avadhany, Milpitas, CA (US);
Paul Abel, Cambridge, MA (US);
Vladimir Tarasov, Frederick, MD (US);
Zack Anderson, Beverly Hills, CA (US)

(73) Assignee: Levant Power Corporation, Woburn, MA (US)

( * ) Notice: Subject to any disclaimer, the term of this patent is extended or adjusted under 35 U.S.C. 154(b) by 568 days.

(21) Appl. No.: 12/104,800

(22) Filed: Apr. 17, 2008

(65) Prior Publication Data

US 2009/0260935 A1 Oct. 22, 2009

(51) Int. Cl.
*F16F 9/00* (2006.01)
*B60K 6/00* (2007.10)

(52) U.S. Cl. .................................... 188/316; 180/165

(58) Field of Classification Search .............. 188/316, 188/297, 322.21, 314; 303/152, 154; 180/165
See application file for complete search history.

(56) References Cited

U.S. PATENT DOCUMENTS

| | | |
|---|---|---|
| 998,128 A | 7/1911 | Smith |
| 1,116,293 A | 11/1914 | Kane |
| 1,290,293 A | 1/1919 | Morski |
| 2,194,530 A | 3/1940 | Torstensson |
| 2,885,202 A | 5/1959 | Trumper et al. |
| 2,958,292 A | 11/1960 | Lipe et al. |
| 3,507,580 A | 4/1970 | Howard |
| 3,515,889 A | 6/1970 | Kammerer |
| 3,559,027 A | 1/1971 | Arsem |
| 368,859 A | 9/1972 | Hudspeth et al. |
| 3,688,859 A | 9/1972 | Hudspeth et al. |
| 3,800,202 A | 3/1974 | Oswald |
| 3,803,906 A | 4/1974 | Ross |
| 3,921,746 A | 11/1975 | Lewus |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 12/1986 | Williams et al. |

(Continued)

FOREIGN PATENT DOCUMENTS

| | | |
|---|---|---|
| DE | 3937987 A1 | 5/1991 |
| DE | 195 35 752 A1 | 3/1997 |

(Continued)

OTHER PUBLICATIONS

International Search Report and Written Opinion from PCT Application PCT/US2009/040749 dated Jul. 15, 2009.

(Continued)

*Primary Examiner* — Robert A Siconolfi
*Assistant Examiner* — Vishal Sahni
(74) *Attorney, Agent, or Firm* — Wolf, Greenfield & Sacks, P.C.

(57) ABSTRACT

Regenerative shock absorber. A piston is disposed for reciprocating motion within a cylinder as a vehicle's suspension system deflects. Hydraulic fluid passes through an hydraulic motor to turn its shaft. The hydraulic motor shaft is connected to an electric generator to generate electricity. Flow characteristics of hydraulic circuits are selected to provide suspension system damping for appropriate wheel control.

25 Claims, 5 Drawing Sheets

U.S. PATENT DOCUMENTS

| | | | |
|---|---|---|---|
| 4,673,194 A | 6/1987 | Sugasawa | |
| 4,729,459 A | 3/1988 | Inagaki et al. | |
| 4,740,711 A | 4/1988 | Sato et al. | |
| 4,815,575 A | 3/1989 | Murty | |
| 4,872,701 A | 10/1989 | Akatsu et al. | |
| 4,887,699 A | 12/1989 | Ivers et al. | |
| 4,908,553 A | 3/1990 | Hoppie et al. | |
| 4,921,080 A | 5/1990 | Lin | |
| 4,936,423 A | 6/1990 | Karnopp | |
| 4,981,309 A | 1/1991 | Froeschle et al. | |
| 5,034,890 A | 7/1991 | Sugasawa et al. | |
| 5,046,309 A | 9/1991 | Yoshino et al. | |
| 5,060,959 A | 10/1991 | Davis et al. | |
| 5,091,679 A | 2/1992 | Murty et al. | |
| 5,098,119 A | 3/1992 | Williams et al. | |
| 5,215,327 A | 6/1993 | Gatter et al. | |
| 5,243,525 A | 9/1993 | Tsutsumi et al. | |
| 5,276,622 A | 1/1994 | Miller et al. | |
| 5,291,960 A | 3/1994 | Brandenburg et al. | |
| 5,295,705 A | 3/1994 | Butsuen et al. | |
| 5,337,560 A | 8/1994 | Abdelmalek et al. | |
| 5,377,791 A | 1/1995 | Kawashima et al. | |
| 5,391,953 A | 2/1995 | Van de Veen | |
| 5,570,286 A | 10/1996 | Margolis et al. | |
| 5,590,734 A | 1/1997 | Caires | |
| 5,608,308 A | 3/1997 | Kiuchi et al. | |
| 5,659,205 A | 8/1997 | Weisser et al. | |
| 5,684,383 A | 11/1997 | Tsuji et al. | |
| 5,717,303 A | 2/1998 | Engel | |
| 5,764,009 A | 6/1998 | Fukaya et al. | |
| 5,794,439 A | 8/1998 | Lisniansky | |
| 5,839,800 A | 11/1998 | Koga et al. | |
| 5,941,328 A | 8/1999 | Lyons et al. | |
| 6,049,746 A | 4/2000 | Southward et al. | |
| 6,111,375 A * | 8/2000 | Zenobi | 318/376 |
| 6,349,543 B1 | 2/2002 | Lisniansky | |
| 6,394,238 B1 * | 5/2002 | Rogala | 188/266.2 |
| 6,441,508 B1 | 8/2002 | Hylton | |
| 6,559,553 B2 | 5/2003 | Yumita | |
| 6,575,484 B2 * | 6/2003 | Rogala et al. | 280/124.158 |
| 6,592,060 B1 | 7/2003 | Vomhof et al. | |
| 6,631,960 B2 | 10/2003 | Grand et al. | |
| 6,765,389 B1 | 7/2004 | Moore | |
| 6,876,100 B2 | 4/2005 | Yumita | |
| 6,908,162 B2 | 6/2005 | Obayashi et al. | |
| 6,920,951 B2 | 7/2005 | Song et al. | |
| 6,952,060 B2 | 10/2005 | Goldner et al. | |
| 6,964,325 B2 | 11/2005 | Maes | |
| 6,973,880 B2 | 12/2005 | Kumar | |
| 7,015,594 B2 | 3/2006 | Asada | |
| 7,023,107 B2 | 4/2006 | Okuda et al. | |
| 7,034,482 B2 * | 4/2006 | Komiyama et al. | 318/376 |
| 7,087,342 B2 | 8/2006 | Song | |
| 7,335,999 B2 | 2/2008 | Potter | |
| 7,336,002 B2 | 2/2008 | Kato et al. | |
| 7,392,998 B2 | 7/2008 | Runkel | |
| 7,854,203 B2 | 12/2010 | Kumar | |
| 2002/0060551 A1 | 5/2002 | Ikeda | |
| 2002/0070510 A1 * | 6/2002 | Rogala | 280/6.153 |
| 2002/0145404 A1 | 10/2002 | Dasgupta et al. | |
| 2003/0034697 A1 | 2/2003 | Goldner et al. | |
| 2003/0150352 A1 | 8/2003 | Kumar | |
| 2003/0169048 A1 | 9/2003 | Kim et al. | |
| 2004/0119289 A1 | 6/2004 | Zabramny | |
| 2004/0207350 A1 | 10/2004 | Wilton et al. | |
| 2004/0212273 A1 | 10/2004 | Gould | |
| 2007/0018626 A1 * | 1/2007 | Chi | 323/282 |
| 2007/0089919 A1 | 4/2007 | de la Torre et al. | |
| 2007/0089924 A1 * | 4/2007 | de la Torre et al. | 180/305 |
| 2008/0012262 A1 | 1/2008 | Carabelli | |
| 2008/0238396 A1 * | 10/2008 | Ng et al. | 323/284 |
| 2008/0257626 A1 | 10/2008 | Carabelli et al. | |
| 2010/0072760 A1 | 3/2010 | Bavetta et al. | |
| 2010/0262308 A1 | 10/2010 | Bacerra et al. | |

FOREIGN PATENT DOCUMENTS

| | | |
|---|---|---|
| EP | 1878598 | 1/2008 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | 2003-035254 | 2/2003 |
| WO | WO 97/26145 A | 7/1997 |

OTHER PUBLICATIONS

International Search Report and Written Opinion from PCT Application PCT/US2010/002116 dated Oct. 28, 2010.

International Search Report and Written Opinion from PCT Application PCT/US2010/002116 dated Jul. 29, 2010.

Shen et al., Automative electric power and energy mangement—a system approach. Business Briefing: Global Automotive Manufacturing and Technology. 2003:1-5.

\* cited by examiner

REGENERATIVE SHOCK ABSORBER

BACKGROUND OF INVENTION

This invention relates to shock absorbers and more particularly to shock absorbers that capture energy resulting from the relative motion of a vehicle's suspension system.

It is known that automobiles are inefficient, wasting over 80% of the energy stored in the fuel as heat. Thus eight of every ten gallons in the vehicle's tank don't help propel the vehicle.

Automobile manufacturers have made costly strides to improve fuel economy. For example, regenerative braking is standard on many hybrid automobiles. Car makers also spend a great deal of effort to reduce wind drag so as to improve fuel economy through streamlined, low drag automobile body designs. Manufacturers also use lighter, yet more expensive, materials to reduce vehicle weight to reduce fuel consumption.

Motor vehicles include a suspension system to control vertical motion of the wheel with respect to the vehicle. In addition to springs, shock absorbers are provided to provide damping. The energy removed from a conventional suspension system is lost as heat. There are known systems that attempt to recover suspension system energy. For example, U.S. Pat. No. 7,261,171 teaches a mechanical arrangement in which reciprocating movements of a wheel relative to a vehicle body are converted to rotations of an armature of a generator to produce electricity for recharging the battery of the vehicle. Another electromechanical regenerative system is disclosed in U.S. Pat. No. 5,570,286 that utilizes a magnet moving in relation to conductive coils.

United States published pending Application No. U.S. 2007/0089924 A1 discloses an hydraulic system for recovering energy from the relative motion between a vehicle body and its wheels. This published application, however, requires a conventional shock absorber to provide the necessary damping function. Further, this application lacks a capacitive reservoir in the hydraulic circuit that is necessary for an operative system.

It is therefore an object of the present invention to provide a regenerative shock absorber that not only recovers energy from the reciprocating motion of a vehicle's suspension system, but also provides the damping function so as to make unnecessary a separate shock absorber.

BRIEF SUMMARY OF INVENTION

In one aspect, the regenerative shock absorber of the invention includes a piston disposed for reciprocating motion within a cylinder as a vehicle's suspension system deflects. Hydraulic fluid is contained within the cylinder. A first fluid circuit is in fluid communication with (1) a first chamber in the cylinder on a first side of the piston, (2) in fluid communication with an hydraulic motor and (3) in fluid communication with a capacitive reservoir. Upon compression of the piston, hydraulic fluid passes through the hydraulic motor thereby turning a shaft thereof. A second fluid circuit is in fluid communication with a second chamber in the cylinder on a second side of the piston and also in fluid communication with the first chamber. Upon extension of the piston, hydraulic fluid passes from the second chamber to the first chamber. An electric generator is connected to the hydraulic motor shaft for generating electricity upon rotation of the shaft.

In yet another aspect, the regenerative shock absorber of the invention includes an hydraulic circuit arrangement so that energy may be harvested during both compression or relaxation of the shock absorber. In this embodiment, upon compression or relaxation of the shock absorber, the resulting pressure differential across the hydraulic motor will induce rotational motion of its output shaft. This output shaft is directly connected to a permanent magnet generator/DC electric motor. The wattage rating of the motor is selected entirely based on the vehicle's mass and spring stiffness.

The electric energy generated by the generator may be used by the vehicle as it is generated or stored in, for example, the vehicle's battery. It is preferred that the harvested electricity be used to power components on a vehicle that would otherwise strain the internal combustion engine, thereby increasing fuel efficiency.

Beyond the basic fluid losses in the hydraulic circuits, damping is provided mostly by the electric generator as the back-emf resists rotational motion of the armature relative to the stator. This resistance is transferred directly to the shock fluid by the hydraulic motor. The damping force provided by the motor is selected to be directly proportional to the velocity of the hydraulic fluid so that increased fluid velocity results in an increased damping force.

The capacitive reservoir accommodates the piston shaft volume that is introduced upon the compression stroke of the shock absorber of the invention.

DESCRIPTION OF THE PREFERRED EMBODIMENT

First of all, some of the theory on which the present invention is based will be discussed. It is important to note how much energy is typically lost in the vertical motion of a car or truck so as to be able to decide whether the energy is worth harvesting. The model the inventors chose to use is a simple spring-based model in which the energy that is present in the vertical motion of a car can be observed in the compression and extension of its springs. The energy in a compressed spring is given by the equation $$E = \int F dx = \frac{1}{2}kx^2.$$

Using an experimentally determined value for k of 1.2×105 N/m, we find that for a 3500 pound automobile, vertical displacements store the amounts of energy in a single spring as shown below. We note that heavy truck springs are much stiffer.

| | | |
|---|---|---|
| 1 cm displacement: 6 J | Summing over | 24 J |
| 3 cm displacement: 54 J | → | 216 J |
| 6 cm displacement: 216 J | four wheels | 864 J |
| 9 cm displacement: 486 J | | 1994 J |

We have approximated city driving by assuming that the springs undergo vibrations of magnitude 2 cm at a frequency 3 Hz, keeping in mind that work is done both compressing and extending the spring so that energy can be harvested from both of these motions. Based on these assumptions, a one hour drive generates 1.34 kilowatt-hours of energy available to harvest.

Figure 1:
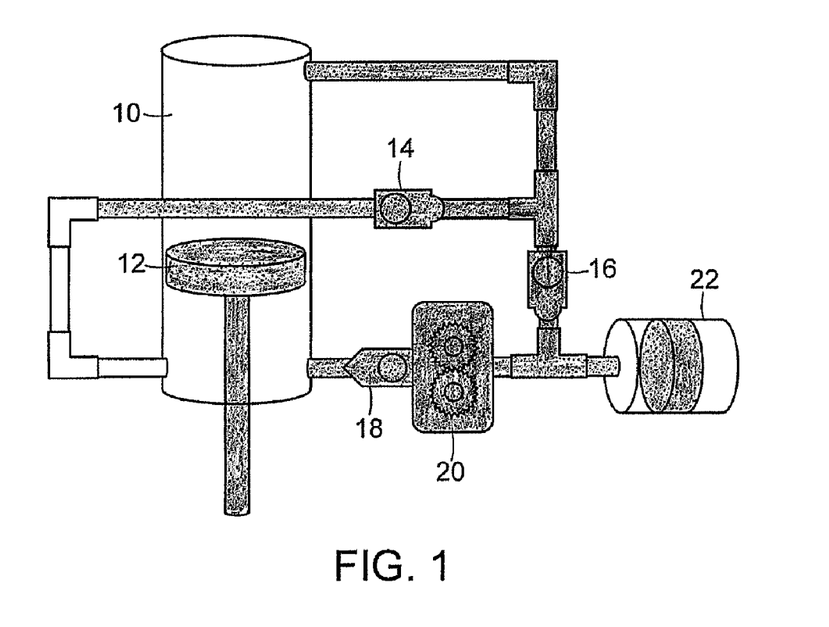
FIG. 1 is a cross-sectional view of an embodiment of the invention disclosed herein.

With reference now to the drawing, FIG. 1 illustrates the overall system in a first embodiment. Shock body 10 is a cylinder in which a piston 12 resides for reciprocating motion. Check valves 14, 16, and 18 control the flow of hydraulic fluid. The system also includes an hydraulic motor 20 and a capacitive reservoir 22.

Figure 2:
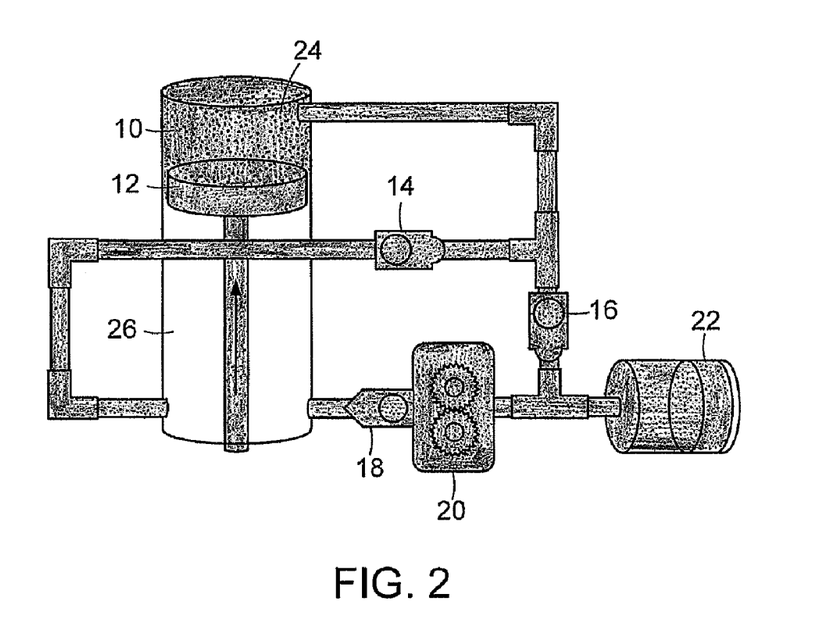
FIG. 2 is a cross-sectional view of the embodiment of FIG. 1 illustrating fluid flow upon compression of the piston.

Flow of hydraulic fluid upon compression of the piston 12 will now be described in conjunction with FIG. 2. As the piston 12 is compressed, pressurized hydraulic fluid builds in the top part of a chamber 24 and is passed through the check valve 16. Check valve 14 prevents the hydraulic fluid from flowing into a bottom chamber 26. After passing through the check valve 16, the fluid is directed into an hydraulic motor 20 and into a capacitive reservoir 22. The capacitive reservoir 22 acts to store any impulsive pressure surges and smooths out the pressure of the hydraulic fluid as it is fed into the hydraulic motor 20.

Figure 3:
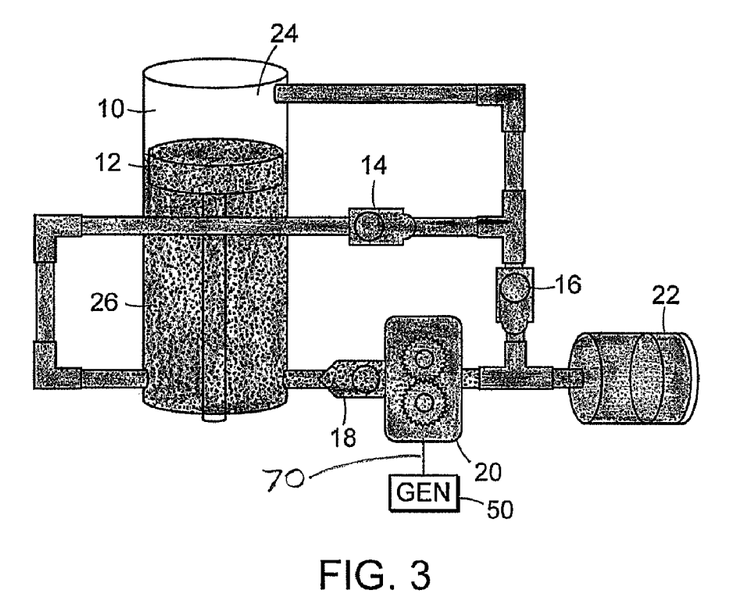
FIG. 3 is a cross-sectional view of the embodiment of FIG. 1 illustrating fluid flow through a hydraulic motor.

With reference now to FIG. 3, as hydraulic fluid passes through the hydraulic motor 20, it rotates the motor's shaft 70. The shaft 70 of the motor 20 is coupled to a generator 50 such as a permanent magnet generator. The output of the generator may charge a battery or power an automobile's electric systems when the hydraulic motor turns. Power electronics is connected to the output of the generator 50 as will be described below.

Figure 4:
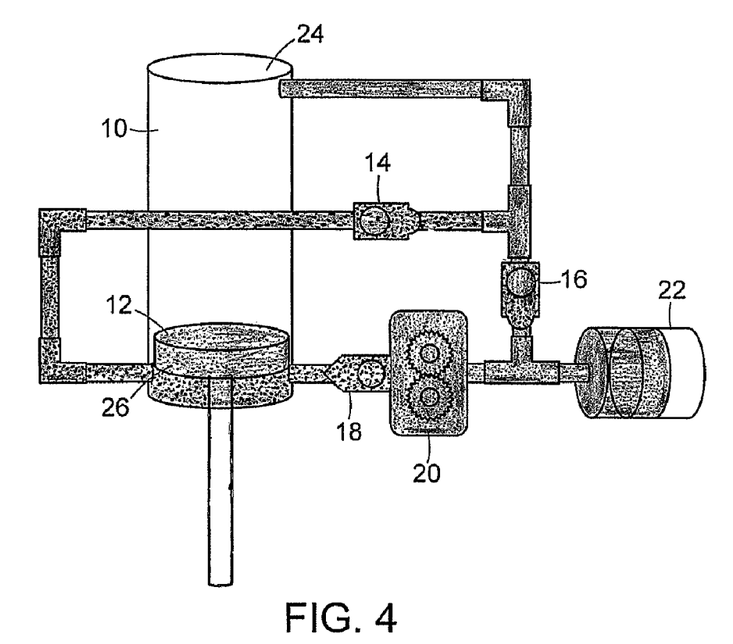
FIG. 4 is a cross-sectional view of the embodiment of FIG. 1 illustrating fluid flow upon extension of the piston.
Figure 5:
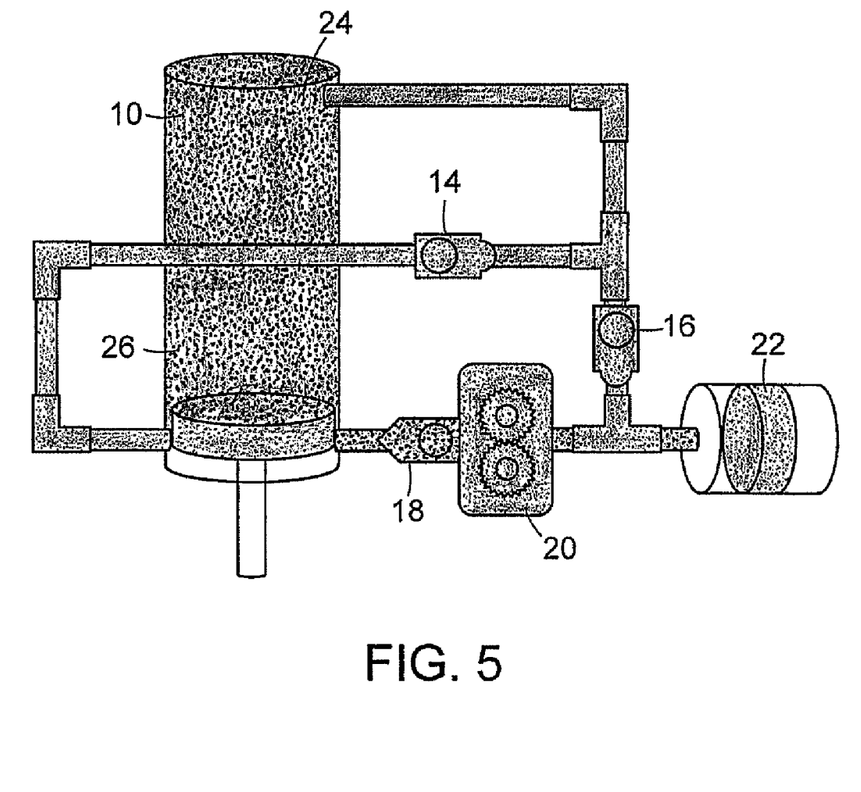
FIG. 5 is a cross-sectional view of the embodiment of FIG. 1 illustrating fluid flow back into a top portion of the cylinder.

FIG. 4 illustrates fluid flow as the piston 12 extends. When the piston 12 moves downwardly, pressurized hydraulic fluid is compressed in the bottom portion of the chamber 26 and passes through check valve 14. Check valve 18 prevents the fluid from flowing back into the hydraulic motor 20. The fluid passing through the check valve 14 flows into the top chamber 24.

Flow characteristics of at least one of the fluid flow circuits may be selected to provide an effective damping in addition to recovery of energy. In this way, the system of the invention not only provides for energy recovery, but also effective damping for wheel control, thereby eliminating the need for a conventional shock absorber.

Figure 6:
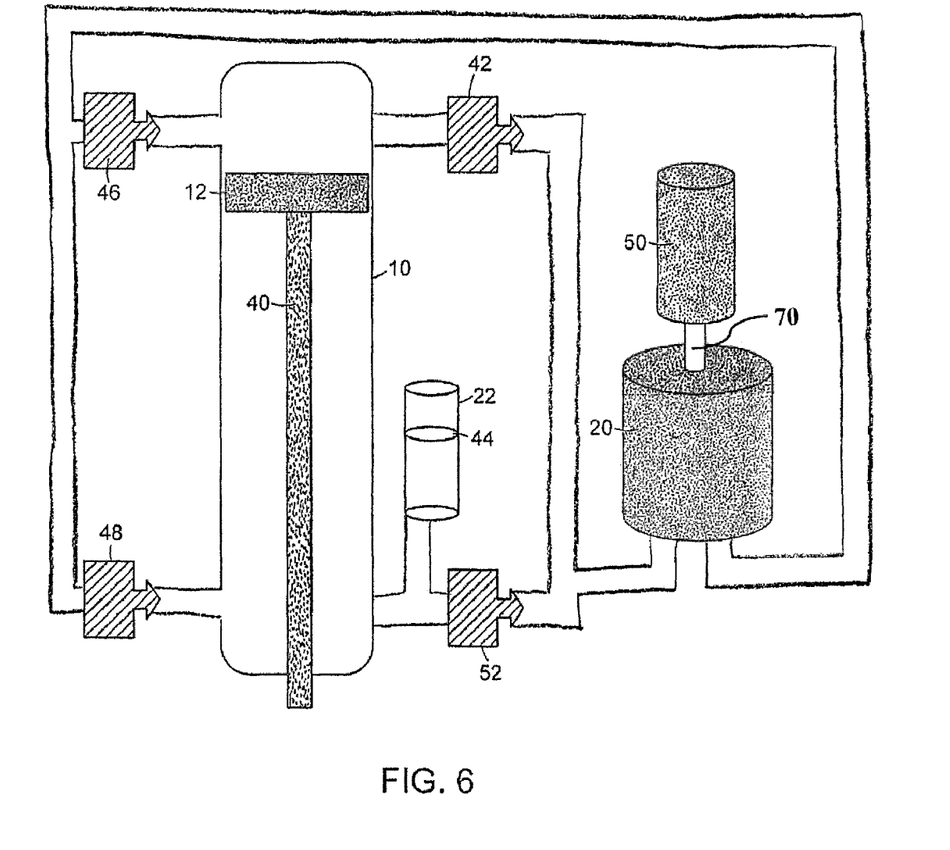
FIG. 6 is a schematic diagram of another embodiment of the invention that harvests power upon both compression and extension of the suspension system.

Yet another embodiment of the invention is shown in FIG. 6. This embodiment allows energy to be recovered during both compression and extension of the piston. As the piston 12, supported by a shaft 40, is compressed hydraulic fluid will pass through a check valve 42 and into capacitive reservoir 22 and includes an emulsion diaphragm 44 that accommodates piston shaft 40 volume that is introduced upon compression stroke of the system. Hydraulic fluid also flows into hydraulic motor 20 and returns to the shock body 10 through check valves 46 and 48. The hydraulic motor 20 actuates an electric generator 50. A suitable electric generator 50 is a permanent magnet generator/DC electric motor.

Upon extension of the piston 12, hydraulic fluid passes through a check valve 52 and into the capacitive reservoir 22 and on through the hydraulic motor 20. As before, hydraulic fluid returns to the shock body 10 through check valves 46 and 48. Note that upon compression and extension of the piston 12, hydraulic fluid flows in the same direction through the motor 20 thereby turning its shaft 70 in the same direction for actuating the electric generator 50.

The power electronics to implement the regenerative shock absorber of the invention will now be discussed in conjunction with FIG. 7. The output of the generator 50 is connected to a time-averaged resistance feedback controller 60 that switches the output from the DC generator 50 among a low resistance element 62, a voltage controlled output converter 64, and an open circuit connection 66. The output of the voltage controlled output converter 64 is always connected to an output load such as a car battery 68. A voltage controlled output converter is not necessarily a buck/boost converter; however, a buck/boost converter is one type of voltage controlled output converter. We mention the buck/boost converter because it is one common way of implementing a voltage controlled converter. The voltage controlled output converter 64, sometimes referred to as a buck/boost converter, and with a voltage-feedback circuit adjusted to a reference voltage maintain a given output voltage level. This arrangement allows several regenerative shock absorbers to be wired in parallel and setting the voltage reference insures safe voltage output. A diode (not shown) in the converter 64 insures that power can only flow out from the generator 50. A filtering capacitor (not shown) on the input of the converter maintains voltage to the input of the converter even while the time-averaged resistance feedback controller switches the generator between multiple elements. In order to control the rate of damping, the generator 50 output is switched between the resistive element 62, the buck/boost converter 64, and the open circuit connection 66. For a typical output load (such as an uncharged car battery), this mode results in heavy, moderate/heavy, and no damping (ignoring friction), respectively. Using pulse width modulation (PWM) to switch between these alternatives at a high rate allows very selective control over damping. Since output power is only derived while the generator 50 is connected to the buck/boost converter 64, the controller 60 is biased to use this connection over switching between the resistive and open connection. Typically a microcontroller with appropriate sensors to determine the resistance seen by the generator is used for this controller 60. Switching speeds for both the resistance feedback controller 60 and the converter 64 are selected to ensure the converter 64 and its input capacitor are able to continuously conduct.

The controller 60 modifies the resistance across the generator 50 winding, thus affecting the damping characteristics of the shock absorber and adjusting the output voltage enabling the system to be safely connected to several types of loads. As mentioned above, resistance across the generator winding is achieved by switching the output leads of the generator 50 between the three sources: the low resistance element 62, the converter 64, and the open circuit 66. The low resistance element 62 (such as a closed-circuit connection (a wire)) creates high damping force. The open circuit connection 66 provides very low damping. Depending on the load connected to the output of the converter 64, the converter provides differing damping force. The controller 60 preferably uses feedback to achieve a given time averaged effective resistance across the generator 50. This feedback may come from sensors such as a voltage and current sensor placed across the generator terminals. This resistance can be set by the manufacturer, the driver (to dynamically adjust the suspension dynamics based on road conditions, driving, or cargo), or even by sensors such as strain gauges that adjust damping based on cargo weight. Adjustment of output voltage is achieved solely by the converter 64. The converter 64 has its own feedback loop that maintains a constant voltage output, when powered. Since input power from the suspension is varying, the converter 64 holds the voltage steady while allowing current flow to fluctuate. The converter 64 circuitry is similar to a standard buck/boost converter with negative feedback based on output voltage. This arrangement insures power only flows out (the load is unable to drive the input, in this case, the generator). Capacitors (not shown) smooth the output voltage. It is noted that any type of efficient converter that is able to maintain a given voltage, ensure one-way current flow, and have sufficient input filtering to accommodate a PWM input, can be used. The buck/boost converter 64 is merely one such example.

Depending on switching duty cycle, this circuitry has the effect of either reducing the output voltage or increasing output voltage. Duty cycle is controlled via a feedback loop that maintains a given output voltage. Neglecting parasitics, the buck/boost converter 64 operation is perfectly efficient. Thus for the regenerative shock absorber disclosed herein connected to a conventional 12v car battery, the converter 64 will convert 6v at 1 A from the generator into 12v at 0.5 A. Likewise it will convert 48v at 1 A into 12v at 4 A. Note that the voltage stays constant regardless of the input, but the current changes. Power is conserved and all the energy from the generator is harvested for use.

Figure 7:
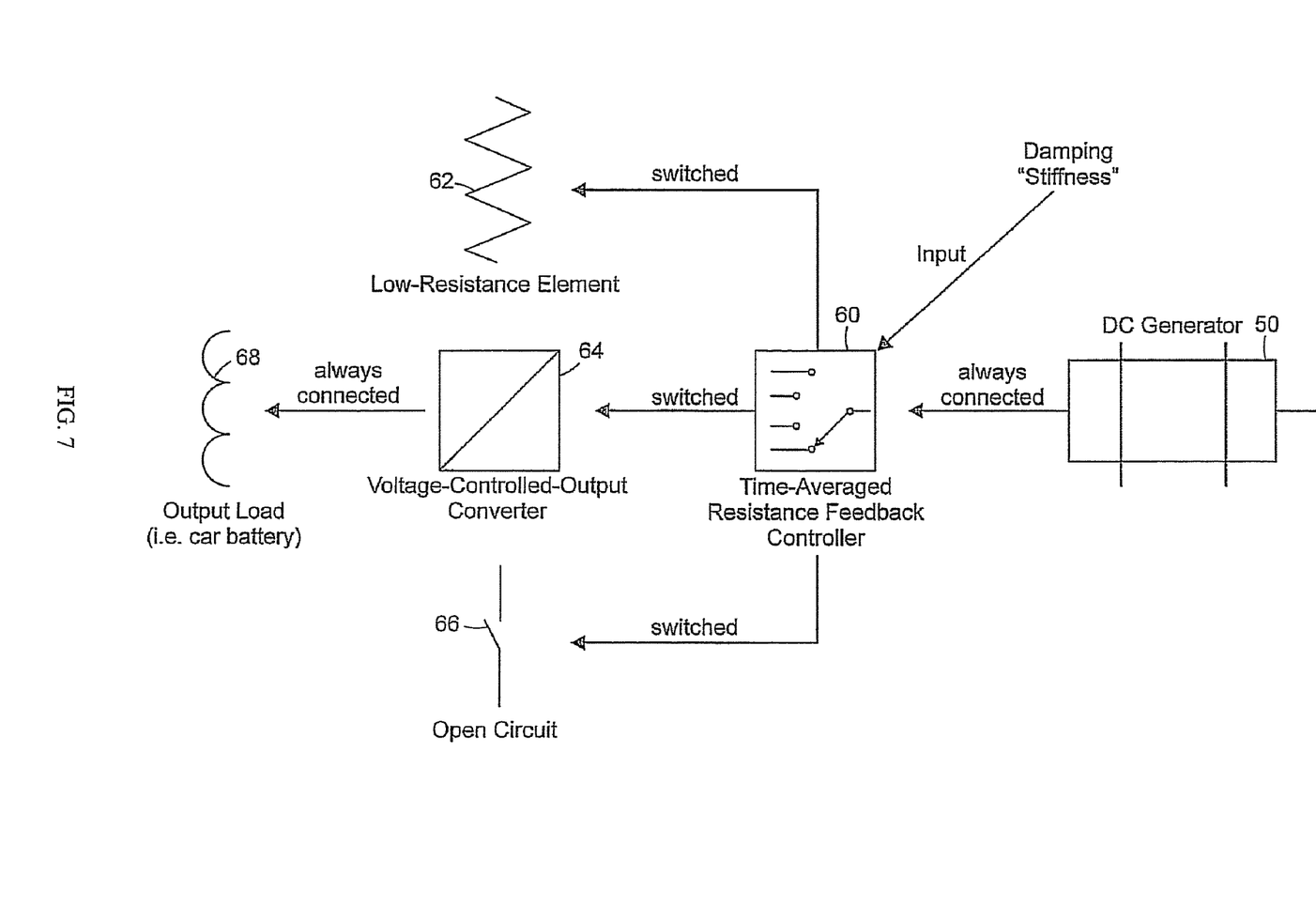
FIG. 7 is a schematic diagram of an embodiment of power electronics for use with the invention.

The arrangement in FIG. 7 is able to dissipate energy as heat through the resistive element 62. If, for example, the regenerative shock absorber of the invention is connected to a fully charged battery, no more energy can safely go into the battery. Thus it is as if the system is disconnected from a load. With a naive implementation, this would result in the generator having near infinite resistance between its terminals, resulting in zero back-EMF. Without back-EMF there is no damping in the suspension (other than from frictional sources), and the shock absorber does not serve its primary purpose of damping suspension movement. This error case is solved by selectively dissipating energy as heat through the resistive element 62. The circuitry can pulse-width-modulate a connection between the generator windings and a low resistance element. This low resistance connection will allow the generator to produce back-EMF proportional to the shaft velocity and inversely proportional to the connection resistance. No energy is harvested for use in this mode. When the generator 50 is connected to the open circuit connection 66, the generator winding is disconnected from the load. The generator output is effectively an open-circuit. Very little back-EMF is produced and no energy is harvested for use in this mode.

The power electronics discussed above in conjunction with FIG. 7 achieves four objectives. First, the circuitry provides generator isolation to insure that each shock operates independently of the output load it is connected to, i.e., battery voltage. Second, the system provides variable damping that is electronically modified either by the user or automatically via sensors such as a strain gauge sensor that adjusts performance based on vehicle weight. These sensors merely change the reference resistance that the resistance feedback controller adjusts for. The system also enables operation with multiple units by matching voltage between multiple units wired in parallel. Finally, the circuitry provides battery-safe charging by regulating output voltage to safe levels.

The regenerative shock absorber of the present invention is applicable to any wheeled vehicle; heavy trucks remain a compelling target because of their substantial weight and high suspension spring stiffness. This technology is also suitable for military vehicles.

It is recognized that modifications and variations of the invention disclosed herein will be apparent to those of ordinary skill in the art. All such modifications and variations are included within the scope of the appended claims.

What is claimed is:

1. A motor vehicle comprising: a wheel; a suspension system to control vertical motion of the wheel; and a regenerative shock absorber coupled to the suspension system, the regenerative shock absorber comprising a piston disposed for reciprocating motion within a cylinder in response to vehicle movement, the piston including a piston rod;

hydraulic fluid contained within the cylinder;

a fluid circuit in fluid communication with a first chamber in the cylinder on a first side of the piston, in fluid communication with a hydraulic motor and wherein upon compression of the piston, hydraulic fluid passes through the hydraulic motor thereby turning a shaft thereof, the fluid circuit in fluid communication with a second chamber in the cylinder on a second side of the piston and in fluid communication with the first chamber, wherein upon extension of the piston, hydraulic fluid passes from the second chamber to the first chamber through the hydraulic motor;

a capacitive reservoir in fluid communication with the fluid circuit, the capacitive reservoir configured to accommodate a volume of the piston rod introduced into the second chamber upon compression of the piston;

for generating electricity upon rotation of the shaft; and a controller configured to modify the resistance across the electric generator to modify the damping characteristics, wherein a back-emf on the generator resists motion of an armature relative to a stator to control the flow characteristics of the fluid to both recover energy in response to vehicle movement and to provide effective damping of the suspension system for wheel control without a separate conventional shock absorber included in the suspension system.

2. The regenerative shock absorber of claim 1 further including check valves in the fluid circuit to control flow.

3. The regenerative shock absorber of claim 1 further including power electronics circuitry to provide variable damping of the electric generator.

4. The regenerative shock absorber of claim 3 wherein the power electronics includes a time-averaged resistance feedback controller and a voltage-controlled-output converter.

5. A motor vehicle comprising: a wheel; a suspension system to control vertical motion of the wheel; and a regenerative shock absorber coupled to the suspension system, the regenerative shock absorber comprising a piston disposed for reciprocating motion within a chamber in response to vehicle movement, the piston including a piston rod;

a fluid circuit that fluidly connects a first portion of the chamber on a first side of the piston, a hydraulic motor having a shaft, a capacitive reservoir used to accommodate piston rod volume and a second portion of the chamber on a second side of the piston, wherein upon movement of the piston in a first direction, fluid in the fluid circuit passes from the first portion of the chamber through the hydraulic motor toward the second portion of the chamber, and wherein upon movement of the piston in a second direction opposite the first direction, fluid in the fluid circuit passes from the second portion of the chamber through the hydraulic motor and toward the first portion of the chamber;

an electric generator connected to the hydraulic motor shaft for generating electricity upon rotation of the hydraulic motor shaft caused by passing of fluid in the fluid circuit through the hydraulic motor; and a controller configured to modify the resistance across the electric generator to modify the damping characteristics, wherein a back-emf on the generator resists motion of an armature relative to a stator to control the flow characteristics of the fluid to both recover energy in response to vehicle movement and to provide effective damping of the suspension system for wheel control without a separate conventional shock absorber included in the suspension system.

6. The regenerative shock absorber of claim 5, further including check valves in the fluid circuit to control flow.

7. The regenerative shock absorber of claim 5, further including power electronics circuitry to provide variable damping by the electric generator.

8. The regenerative shock absorber of claim 7, wherein the power electronics includes a time-averaged resistance feedback controller and a voltage-controlled-output converter.

9. The regenerative shock absorber of claim 5, wherein the controller is configured to modify the resistance across the electric generator to modify the damping characteristics.

10. The regenerative shock absorber of claim 1, wherein the controller controls damping of the electric generator by controlling the resistance across the electric generator.

11. The regenerative shock absorber of claim 10, wherein the controller controls the resistance across the electric generator winding by selectively switching the electric generator between a first resistance element, an open circuit, and an electrical load.

12. The regenerative shock absorber of claim 11, wherein the controller selectively switches the electric generator between the first resistance element, the open circuit, and the electrical load using pulse width modulation.

13. The regenerative shock absorber of claim 11, wherein damping of the electric generator is independent of power output to the electrical load.

14. The regenerative shock absorber of claim 11, wherein the open circuit comprises a second resistance element, the second resistance element having a higher resistance than the first resistance element.

15. The regenerative shock absorber of claim 11, wherein an electrical connection between the electrical load and the electric generator comprises an output power converter.

16. The regenerative shock absorber of claim 11, wherein the electrical load comprises a vehicle battery.

17. The regenerative shock absorber of claim 1, wherein hydraulic fluid passes through the hydraulic motor in substantially only one direction.

18. The regenerative shock absorber of claim 5, wherein the controller controls damping of the electric generator by controlling the resistance across the electric generator.

19. The regenerative shock absorber of claim 18, wherein the controller controls the resistance across the electric generator winding by selectively switching the electric generator between a first resistance element, an open circuit, and an electrical load.

20. The regenerative shock absorber of claim 19, wherein the controller selectively switches the electric generator between the first resistance element, the open circuit, and the electrical load using pulse width modulation.

21. The regenerative shock absorber of claim 19, wherein damping of the electric generator is independent of power output to the electrical load.

22. The regenerative shock absorber of claim 19, wherein the open circuit comprises a second resistance element, the second resistance element having a higher resistance than the first resistance element.

23. The regenerative shock absorber of claim 19, wherein an electrical connection between the electrical load and the electric generator comprises an output power converter.

24. The regenerative shock absorber of claim 19, wherein the electrical load comprises a vehicle battery.

25. The regenerative shock absorber of claim 5, wherein hydraulic fluid passes through the hydraulic motor in substantially only one direction.

* * * * *

UNITED STATES PATENT AND TRADEMARK OFFICE
CERTIFICATE OF CORRECTION

PATENT NO. : 8,376,100 B2  
APPLICATION NO. : 12/104800  
DATED : February 19, 2013  
INVENTOR(S) : Shakeel Avadhany et al.

Page 1 of 1

It is certified that error appears in the above-identified patent and that said Letters Patent is hereby corrected as shown below:

In the Claims:

Claim 1, Col. 6, line 30 should read:

--an electric generator connected to the hydraulic motor shaft for generating electricity upon rotation of the shaft; and a--.

Signed and Sealed this  
Twenty-third Day of April, 2013

Teresa Stanek Rea  
*Acting Director of the United States Patent and Trademark Office*